Patented Oct. 7, 1930

1,777,945

UNITED STATES PATENT OFFICE

FREDERICK H. UNTIEDT, OF CHEVY CHASE, MARYLAND

PROCESS OF TREATING RUBBER LATEX

No Drawing. Application filed June 20, 1927, Serial No. 200,304. Renewed August 12, 1930.

This invention relates to processes of treating latex and it comprises a process wherein rubber latex, advantageously containing an added foam stabilizing agent, is aerated and agitated to form a stiff foam and the resulting foam treated to solidify the rubber therein.

Numerous processes have been proposed for the production of porous or cellular rubber. It has been suggested to coagulate rubber in such a way that voids or cells are left in the rubbery mass. It is possible, for instance to coagulate rubber latex with acetic acid in such a fashion that the rubbery mass contains numerous irregularly shaped voids of various sizes. It has also been proposed to prepare a porous rubber by milling volatile salts into rubber and thereafter heating the rubber mass to volatilize the salts and thus form voids or spaces.

These prior processes have numerous disadvantages. In the coagulation process, it is difficult to get porous rubber of uniform composition throughout. Besides this, the size of the voids and their distribution throughout the mass varies. Only comparatively large size voids or cells can be formed. Where a volatile salt is added to rubber and incorporated therein, it is difficult to get uniform incorporation and here again, there is no certainty that one batch will have the same physical characteristics as another. Uniformity is difficult to obtain.

I have found that ordinary rubber latex, containing as usual about thirty percent of rubber, can be converted into a foam by passing air into the latex and agitating and that the foam so formed can be dried to form sheets for instance of rubber containing minute voids or cells. It is advantageous to add a foam stabilizing agent to the latex before passing in the air. Such foam stabilizing agents are well known. Soap for instance is excellent. About one percent of ordinary soap is dissolved in the latex and thereafter air is introduced with agitation. The process is much like beating an egg or whipping cream and the resulting foam is stiff and stable. Saponin or soap bark is an excellent foam stabilizing agent to use. Not so much of it is required as when soap is used. About one half percent of saponin, based on the weight of latex, is sufficient. Gelatin, glue, and numerous other substances, all having the property of assisting in, and stabilizing the foam formation, may be used. Rubber latex itself will form a foam however, and the additional foam stabilizing agents can be omitted if desired. I find that better results are obtained when the foam stabilizing agent is present.

In a practical embodiment of my process, I maintain a body of stabilized latex, the material purchasable in the open market, in a vessel having a perforated plate disposed slightly above the bottom. The latex, containing an added foam stabilizing agent, say one percent of ordinary soap, rests on the perforated plate and is held there by air introduced beneath the plate. The introduced air rises through the layer of latex and forms a foam. The foam is agitated with an agitator of convenient construction to subdivide the bubbles formed and agitation is kept up until the foam is dense. At the completion of the process, the foam is quite stiff and holds its shape. The bubbles in the foam, at the end of the foam forming process will be found to have a substantially uniform size and will be uniformly distributed throughout the foam. The bubbles will be of minute size. Indeed, with a well beaten foam, they can hardly be detected without a magnifying glass. The foam has a creamy appearance, much like whipped cream.

The so-prepared foam is then treated to fix or solidify the rubber in it. The foam can be spread out in sheets and left to dry in which case, sheets of porous rubber are obtained having minute pores evenly distributed throughout. The sheet rubber so prepared has the feel of chamois leather and is exceedingly porous. It can absorb a large amount of water and may be put to numerous uses. It may be used in storage batteries, as a filter medium, in surgical belts and the like.

When the foam is dried, which, advantageously, is carried out at room temperature or slightly above, some liquid may separate. That is, the foam may break down slightly. This indicates that agitation of the foam has not been carried far enough or that an insufficient amount of air has been introduced. In such case, the separated liquid is drawn off and the drying continued.

With a well beaten foam, beaten to such an extent that it becomes stiff and tenacious, a condition readily recognized, there occurs but little separation of liquid on drying. I attribute this to the fact that the rubber in the latex coagulates to some degree during the agitation and in the partially coagulated condition the rubber tends to stiffen the foam and make it tenacious. During the beating up of the foam, the first formed bubbles, which are of comparatively large size, are subdivided so that eventually there results a foam having bubbles of minute size.

As stated, if agitation is not carried far enough, when the foam is spread out and allowed to dry, there may be some slight separation of liquid latex. In some relations this is advantageous, especially in coating fabrics, a use to which the latex foam may be put as hereinafter mentioned. The advantage in utilizing a foam having the property of breaking down slightly is that such a foam "wets" the fabric coated so that a strong rubber bond between the fabric and the rubber coating is secured.

When the foam is to be dried to form sheets of porous rubber, it is more advantageous to carry out the agitation to such an extent that virtually no liquid latex separates on drying. The extent to which such agitation must be carried is readily determined by simple experiment. The characteristic of such a foam is that it is stiffer and more tenacious than one in which agitation has not been continued to a degree sufficient to form such a foam.

Instead of using the ordinary latex of commerce, a so-called concentrated latex can be used. And a latex in which some partial coagulation has occurred, whereby the latex is slightly thickened, is also suitable.

Vulcanization, if desired, is best carried out on the dried foam, whether it be in the form of sheets or as a coating. The vulcanization is no part of the present invention. It entails no difficulties and processes are already known by which sheets of rubber, or coated rubber fabrics can be vulcanized.

Not only do I regard the process herein described as new but I also regard the latex foam formed as a new composition of matter. The foam, while it is an intermediate substance, may be transported and used in many relations. It, of course, may be dried or coagulated in the form of sheets. It may be mixed with filling materials prior to drying or coagulation, for instance, incorporation in the latex prior to conversion into a foam by processes well known. It may be used as a coating material. It may be spread on a backing of canvas or the like to form a coated material.

By the term "latex" in the appended claims, I mean of course to broadly include dispersions of rubber in an aqueous medium.

In the appended claims by the term "dense foam," I mean to distinguish from a froth or foamy material. My foams are of such nature that they may be spread out to dry with but little or no breakdown of the cellular structure of the foam. The dried product is micro-porous. Froths or light foam which lose air are rapidly return to a liquid state when allowed to stand are not suitable for forming porous sheets of rubber or rubber coatings on fabrics. My foam is of such consistency that, during drying, substantially all of the water therein leaves the foam by evaporation and not as a liquid. That is, the foam actually dries out to form a dry micro-porous rubber product. Such foams are "stiff" in the sense that a small container thereof may be inverted without loss of contents but such foams are of course spreadable.

In my copending application, Ser. No. 406,978, filed Nov. 13, 1929, which is a continuation in part of this application, I more specifically describe and claim rubberizing fabrics with latex foam.

Having thus described my invention, what I claim is,

1. In a process of preparing a useful material from latex, the step which comprises introducing air into rubber latex containing a foam stabilizing agent and agitating the foam formed to form a stiff, dense foam, said foam being of such character that a layer thereof, upon drying, yields a porous rubber product.

2. The process which comprises forming a foam from rubber latex containing a foam stabilizing agent, said foam being of such character that a layer thereof, upon drying, yields a porous rubber product and thereafter solidifying the rubber in said foam.

3. The process which comprises forming a foam from rubber latex containing a foam stabilizing agent, said foam being of such character that a layer thereof, upon drying, yields a porous rubber product and thereafter drying said foam.

4. The process which comprises passing air into a body of latex containing a foam stabilizing agent, agitating the aerated latex to form a dense foam and thereafter solidifying the rubber in said foam.

5. The process which comprises passing air into a body of latex containing a foam stabilizing agent, agitating the aerated latex to form a dense foam and thereafter drying the foam.

6. In a process of preparing a useful material from latex, the step which comprises agitating a body of latex containing an added foam stabilizing agent in the presence of a suitable gas to form a stiff, dense foam, said foam being of such character that a layer thereof, upon drying, yields a porous rubber product.

7. In a process of preparing a useful material from latex, the step which comprises agitating a body of latex containing a foam stabilizing agent and incorporating a suitable gas in the latex to form a dense foam therefrom, said foam being of such character that a layer thereof, upon drying, yields a porous rubber product.

FREDERICK H. UNTIEDT.